US008567261B2

(12) United States Patent
Fischer et al.

(10) Patent No.: US 8,567,261 B2
(45) Date of Patent: Oct. 29, 2013

(54) DEVICE AND METHOD FOR CHECKING THE LEAK TIGHTNESS OF CAPS ON MEDICAL HOLLOW BODIES

(75) Inventors: Thomas Fischer, Königseggwald (DE); Manfred Simader, Fronreute-Staig (DE); Günter Kavallar, Aulendorf (DE)

(73) Assignee: Arzneimittel GmbH Apotheker Vetter & Co. Ravensburg, Ravensburg (DE)

( * ) Notice: Subject to any disclaimer, the term of this patent is extended or adjusted under 35 U.S.C. 154(b) by 0 days.

(21) Appl. No.: 12/999,579

(22) PCT Filed: Jun. 18, 2009

(86) PCT No.: PCT/EP2009/004387
§ 371 (c)(1),
(2), (4) Date: Dec. 16, 2010

(87) PCT Pub. No.: WO2009/153041
PCT Pub. Date: Dec. 23, 2009

(65) Prior Publication Data

US 2011/0126638 A1 Jun. 2, 2011

(30) Foreign Application Priority Data

Jun. 19, 2008 (DE) ........................ 10 2008 030 271

(51) Int. Cl.
*G01L 3/00* (2006.01)
*G01L 3/02* (2006.01)
*G01L 5/24* (2006.01)
*G01L 3/14* (2006.01)

(52) U.S. Cl.
USPC ................ 73/862.08; 73/862.191; 73/862.23; 73/862.321

(58) Field of Classification Search
USPC .......................... 73/862.08, 862.191, 862.23, 73/862.321–862.339
See application file for complete search history.

(56) References Cited

U.S. PATENT DOCUMENTS 4,501,306 A 2/1985 Chu et al.
4,539,852 A * 9/1985 Feld ................................ 73/847

(Continued)

FOREIGN PATENT DOCUMENTS

CA 2435056 5/2010
DE 3044550 A1 6/1982

(Continued)

OTHER PUBLICATIONS

International Search Report and Written Opinion of the ISA for PCT/EP2009/004133, ISA/EP, mailed Sep. 1, 2009.

(Continued)

*Primary Examiner* — Lisa Caputo
*Assistant Examiner* — Jonathan Dunlap
(74) *Attorney, Agent, or Firm* — Harness, Dickey & Pierce, P.L.C.

(57) ABSTRACT

A device for checking the seal-tightness of closure caps on medical hollow bodies has a drive, a retaining element for the hollow body, and a retaining device for the closure cap. The retaining device is pivotably supported relative to the retaining element. The device further includes a sensor for the relative rotation of the retaining device with respect to the retaining element. A torque may be applied to the closure cap by the drive, the retaining element, and the retaining device. A hollow body and a closure cap are gripped by the retaining device and the retaining element from the same side, as viewed along the longitudinal axis of a hollow body.

28 Claims, 1 Drawing Sheet

(56) References Cited

U.S. PATENT DOCUMENTS

| | | | | | |
|---|---|---|---|---|---|
| 4,674,340 | A | * | 6/1987 | Burt et al. | 73/862.23 |
| 4,716,772 | A | * | 1/1988 | Bubeck et al. | 73/862.23 |
| 4,794,801 | A | * | 1/1989 | Andrews et al. | 73/862.23 |
| 4,811,252 | A | | 3/1989 | Furuse | |
| 4,811,850 | A | * | 3/1989 | Bankuty et al. | 209/546 |
| 4,907,700 | A | * | 3/1990 | Bankuty et al. | 209/546 |
| 4,908,800 | A | | 3/1990 | DiLemmo | |
| 4,989,459 | A | * | 2/1991 | Faber, Jr. | 73/862.23 |
| 5,152,182 | A | * | 10/1992 | Searle | 73/862.23 |
| 5,321,935 | A | | 6/1994 | Spatz et al. | |
| 5,415,050 | A | * | 5/1995 | Trendel et al. | 73/862.23 |
| 5,837,907 | A | * | 11/1998 | Ohmi et al. | 73/862.23 |
| 6,199,350 | B1 | | 3/2001 | Brechel et al. | |
| 6,912,800 | B2 | | 7/2005 | Vetter et al. | |
| 2003/0100866 | A1 | | 5/2003 | Reynolds | |
| 2004/0139811 | A1 | * | 7/2004 | Cirio | 73/865.9 |
| 2007/0267092 | A1 | | 11/2007 | Rink et al. | |
| 2008/0035233 | A1 | | 2/2008 | Luthi et al. | |

FOREIGN PATENT DOCUMENTS

| | | | |
|---|---|---|---|
| DE | 4011398 | | 10/1991 |
| DE | 19614475 | | 10/1997 |
| DE | 19927117 | A1 | 12/2000 |
| DE | 102006025811 | A1 | 12/2007 |
| EP | 0328249 | A | 8/1989 |
| EP | 1386619 | | 10/2007 |
| GB | 2324999 | A | 11/1998 |
| JP | 2003004583 | | 1/2003 |
| WO | 2008/012611 | A | 1/2008 |
| WO | 2009/149894 | A1 | 12/2009 |

OTHER PUBLICATIONS

English Translation of the International Preliminary Report on Patentability for PCT/EP2009/004387, issued Jan. 18, 2011, incorporating the English Translation of the Written Opinion of the ISA, mailed Sep. 25, 2009.

English Translation of the International Preliminary Report on Patentability for PCT/EP2009/004133, issued Jan. 18, 2011, incorporating the English Translation of the Written Opinion of the ISA, mailed Sep. 1, 2009.

International Search Report and Written Opinion of the ISA, ISA/EP, mailed Sep. 25, 2009.

* cited by examiner

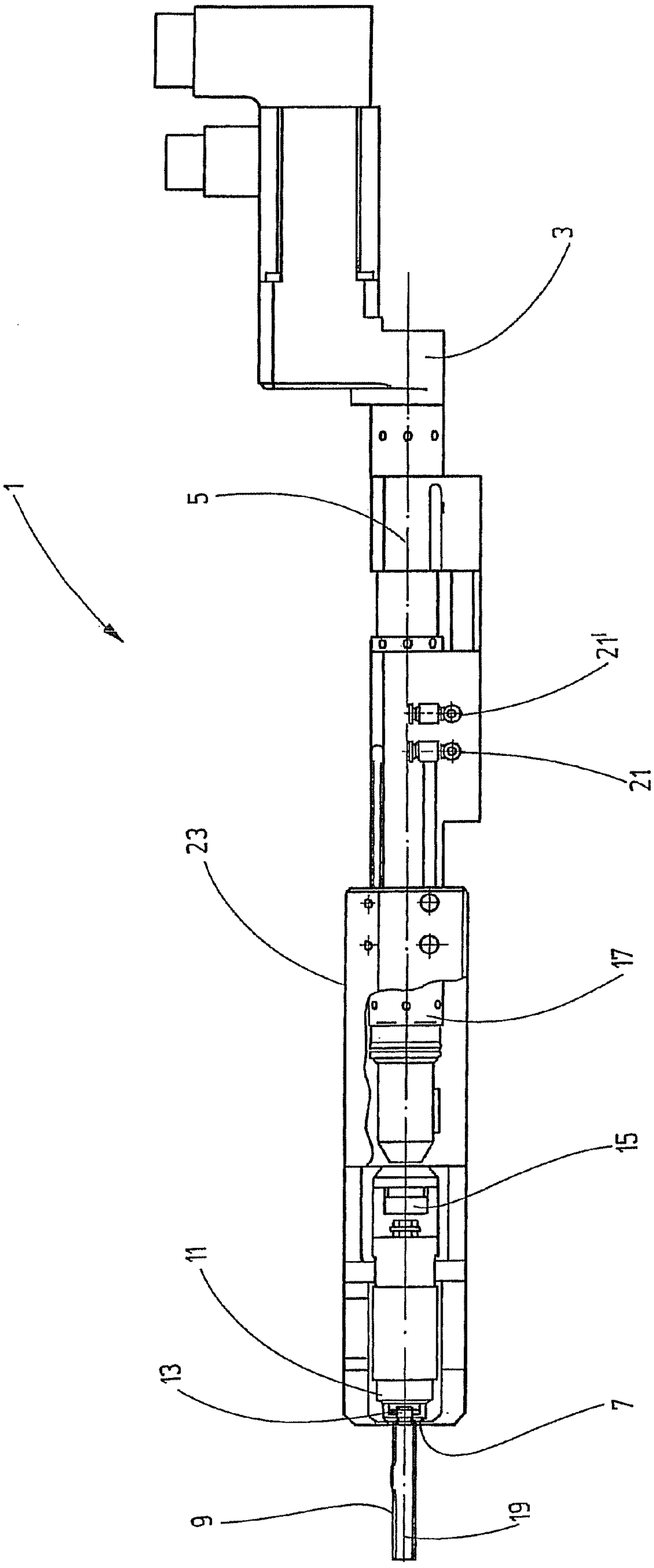
1
3
5
21'
21
23
17
15
11
13
7
9
19

DEVICE AND METHOD FOR CHECKING THE LEAK TIGHTNESS OF CAPS ON MEDICAL HOLLOW BODIES

CROSS-REFERENCE TO RELATED APPLICATIONS

This application is a 371 U.S. National Stage of International Application No. PCT/EP2009/004387, filed Jun. 18, 2009. This application claims priority to German Patent Application No. 10 2008 030 271.6, filed Jun. 19, 2008. The disclosures of the above applications are entirely incorporated by reference herein.

FIELD

The invention relates to a device for checking the seal-tightness of closure caps on medical hollow bodies and a method for checking the seal-tightness of closure caps on medical hollow bodies.

BACKGROUND

Devices of this type have not been known heretofore. Previously, a manual method has been used for checking a medical hollow body, for example a syringe or carpule, for seal-tightness. For this purpose, random samples of the sealed hollow bodies are taken at the end of the production process. These samples are manually checked by having a technician attempt to twist the closure cap relative to the hollow body. If the closure cap is seated firmly enough on the hollow body, thus providing sufficient compression of a sealing washer between the hollow body and the closure cap to ensure a desired seal-tightness, the technician is unable to twist the closure cap except with significant application of force. On the other hand, if the closure cap is not connected firmly enough to the hollow body, so that the sealing washer also is not sufficiently compressed and therefore a desired seal-tightness is not ensured, it is much easier to manually twist the closure cap.

A disadvantage of this procedure is that every technician has a different subjective feeling for the force to be applied, so that the conclusions regarding tightness as a result of the technicians' assessments are highly subjective, not easily reproducible, and difficult to document. It is also disadvantageous that only random samples of the sealed hollow bodies can be checked, whereas it would be desirable to check 100% of the hollow bodies. A further disadvantage is that direct intervention cannot be made in the sealing process, after which a lack of seal-tightness of one or more hollow bodies would be determined, so that a fairly large number of already sealed hollow bodies are present in the production line which must then be checked. If the lack of seal-tightness is due to a malfunction in the sealing facility, this results in a fairly large number of rejects before the malfunction can be eliminated.

SUMMARY

The object of the invention, therefore, is to provide a device for checking the seal-tightness of closure caps on medical hollow bodies which allows objective, easily reproducible, documentable, destruction-free checking which is identical for each test piece. A further aim is for the device to be suitable to allow checking of 100% of the hollow bodies produced, i.e., to check the entire production volume, not just random samples.

The object is achieved using a device having a drive, a retaining element for the medical hollow body, and a retaining device for the closure cap. The retaining device is pivotably supported relative to the retaining element. The device also includes a sensor for the relative rotation of the retaining device with respect to the retaining element. The device is characterized in that by means of the drive, the retaining element, and the retaining device a torque may be applied to the closure cap, and a hollow body as well as a closure cap are gripped by the retaining device and the retaining element from the same side, as viewed along the longitudinal axis of the hollow body. To allow a torque to be applied to the closure cap without the hollow body, for example, co-rotating when the drive cooperates with the retaining device, it is necessary for the closure cap and the hollow body to be gripped by different retainers, whereby the retainers must be supported so as to be rotatable relative to one another. For applying a torque to the closure cap, it is irrelevant whether the drive cooperates with the retaining element or with the retaining device. Since the closure cap is securely connected to the hollow body (for untightly sealed caps, at least until the moment that the closure cap comes off), a torque is also applied to the closure cap when the drive cooperates with the retaining element. A body for which, for example, a lid is to be twisted on or off is usually gripped from various sides, as viewed along its longitudinal axis. For example, a retainer may grip the body in the region of its base, while another retainer grips the lid. In contrast, in the present device it is provided that a hollow body and a closure cap are gripped by the retaining device and the retaining element from the same side, as viewed along the longitudinal axis of the hollow body. Thus, the retaining element for the hollow body is situated relative to the retaining device for the closure cap in such a way that the retaining element grips the hollow body in a region which more or less directly adjoins the closure cap, as viewed along the longitudinal axis of the hollow body. The opposite side of the hollow body thus remains free along the longitudinal axis of the hollow body, which for the first time allows existing production facilities to be equipped with the device. Namely, in this case the hollow bodies are gripped in a known manner at their side opposite from the closure cap in order to be transportable through the production facility. This may be achieved, for example, by providing the hollow bodies in cartridges. However, the hollow bodies may also be grasped by grippers which transport the hollow bodies through the production facility. In any case, in existing production facilities the end of a hollow body opposite from the closure cap is typically not accessible due to the fact that it is intended for transport of the hollow body through the facility. Thus, the facility may be retrofitted with the device according to the invention in a particularly economical manner when the device engages only at the end of the hollow body at which the closure cap is situated. The retaining device for the closure cap and the retaining element for the hollow body are supported so as to be rotatable relative to one another, thus allowing a torque to be applied to the closure cap without the hollow body, for example, co-rotating when the drive cooperates with the retaining device. A sensor is provided which is able to detect a relative rotation of the retaining device with respect to the retaining element.

A device is also preferred which is characterized in that the retaining device and the retaining element are situated on the same side, as viewed along a longitudinal axis of the hollow body. It would also be possible, for example, to guide the retaining device for the closure cap from the side of the hollow body at which the closure cap is situated. At the same time, from the opposite side, along the longitudinal axis of the hollow body, a retaining element for the hollow body could be guided along the extension of the hollow body until it almost or directly reaches the closure cap and thus grips the hollow body in this region. However, it is preferred that the retaining device as well as the retaining element are situated on the same side, preferably in such a way that both the retaining device and the retaining element extend from the side of the hollow body at which the closure cap is situated.

A device is also preferred in which the retaining device and the retaining element are integrally provided together on or in a base body of the device. Thus, the device is not composed of various separate parts, but instead has a single base body which includes the described elements. This also means that the device may have a particularly compact design.

A device is preferred in which the sensor for the relative rotation of the retaining device with respect to the retaining element is a torque sensor. In this case it may be provided that a torque is applied to the closure cap via the drive, the torque initially having a relatively small value which then increases, preferably linearly, to a setpoint value. The setpoint value preferably corresponds to a torque for which a closure cap is connected with sufficient tightness to a hollow body, so that a sealing element situated between the hollow body and the closure cap is compressed in such a way that a desired seal-tightness is achieved, but just to the point at which the closure cap cannot be twisted further. If the test piece is seal-tight, the torque sensor registers the preferably linear increase in the torque, which is preferably also used for regulation, until the setpoint value is reached, and then switches off the drive so that no further torque is applied to the closure cap. In this case the test piece has passed the seal-tightness test, and may be removed from the device. On the other hand, if the closure cap is not seated tightly on the hollow body, it may start to rotate at a lower torque, at the latest at the setpoint value, when the drive cooperates with the retaining device. At the moment that the closure cap comes loose, the torque applied to the closure cap dissipates, since a discontinuous transition from static friction to sliding friction occurs between the closure cap and the sealing element or between the sealing element and the hollow body. This dissipation of the torque may be detected by the torque sensor, which thus detects the onset of relative rotation of the retaining device with respect to the retaining element. The nonlinear torque progression measured at the sensor is characteristic of an untightly sealed test piece. A torque may be applied to the closure cap by the fact that the drive cooperates with either the retaining device or the retaining element. If in this second case an untightly sealed closure cap comes loose, it is held by the retaining device, while the hollow body rotates relative to the closure cap due to the fact that the drive cooperates with the retaining element. For application of a torque to the closure cap, in any event it is irrelevant whether the drive cooperates with the retaining element or with the retaining device. Since the closure cap is securely connected to the hollow body (for untightly sealed caps, at least until the moment that the cap comes off), a torque is also applied to this closure cap when the drive cooperates with the retaining element.

A device is also preferred which is characterized in that the sensor for the relative rotation of the retaining device with respect to the retaining element is an angle sensor which detects the rotational angle of the retaining device relative to the retaining element. In this case, for example a setpoint torque may be directly applied to the closure cap, and the angle sensor determines whether the closure cap may be twisted relative to the hollow body. If this is the case, the test piece has not passed the seal-tightness test. In contrast, the closure cap of a tightly sealed test piece cannot be twisted when the setpoint torque is applied. The setpoint torque may be applied to the closure cap in a particularly simple manner by the fact that the drive is acted on by a defined nominal current or a defined nominal voltage. For this purpose, the relationship between the relevant electrical variables and the torque generated by the drive must be known with great accuracy. A defined torque may then be generated without having to provide a separate torque sensor for this purpose.

In conjunction with the previously described exemplary embodiment, however, it is also preferred that a torque sensor is provided in addition to the angle sensor. The torque sensor is able to determine, for example, whether the torque generated by setting an electrical variable for the drive actually corresponds to the desired setpoint torque. The torque sensor may be used solely for recording the torque, or by means of regulation may ensure that the setpoint torque is always present. However, it is also possible to operate the device in such a way that a torque which preferably increases linearly is applied to the closure cap, and that a relative rotation to be established between the retaining element and the retaining device is not registered on the basis of dissipation of the value measured at the torque sensor, but rather, is registered by the additionally provided angle sensor. The torque sensor is then used solely for detecting the torque which is present at that moment, and, for example, may thus monitor the linearity of the torque progression, and may preferably be used for regulation, or may allow recording of the torques applied to the closure cap.

In conjunction with the two exemplary embodiments previously described, a device is also preferred in which an apparatus for limiting the rotational speed is provided. This is particularly advantageous when a setpoint torque is applied to the closure cap by setting an electrical nominal variable of the drive. Namely, when the closure cap comes loose and begins to rotate, wherein the preset electrical nominal variable is not reduced in a timely manner from its nominal value to a smaller value, the constant torque is still applied to the closure cap, causing the rotation of the closure cap to accelerate when the sliding friction present between the closure cap and the sealing element or between the sealing element and the hollow body is not great enough to prevent such. Such an acceleration may ultimately result in an excessive rotational speed, and possibly even damage to the machine. An apparatus for limiting the rotational speed remedies this situation in that, when a certain maximum rotational speed is reached, the drive is controlled in such a way that a further increase in the rotational speed is not possible. This maximum rotational speed may preferably be set in such a way that the device is not damaged.

Further preferred exemplary embodiments result from the subclaims.

A further object of the invention is to provide a method for checking the seal-tightness of closure caps on medical hollow bodies which allows objective, destruction-free testing which is identical for each test piece, and which is possible for 100% of the finished, sealed hollow bodies produced in a facility.

The method includes the following steps: A hollow body is gripped and held by the retaining element. The closure cap is also gripped and held by the retaining device. A torque is applied to the closure cap by means of the drive. A relative rotation of the retaining device with respect to the retaining element is detected by a sensor. It is thus possible to assess whether the closure cap is able to twist relative to the hollow body when a torque is applied to the closure cap. Thus, tightly sealed hollow bodies may be distinguished from untightly sealed hollow bodies in the manner previously described.

A method is also preferred which is characterized in that the torque applied to the closure cap is detected by a torque sensor. This torque sensor may be used for recording the applied torque or for checking the linearity of a torque ramp. On the other hand, via the torque applied to the closure cap the torque sensor may be used at the same time to determine the onset of relative rotation of the retaining device with respect to the retaining element due to the fact the torque acting on the closure cap dissipates at the moment that relative rotation begins, when a discontinuous transition occurs between static friction and sliding friction.

A method is also preferred in which the rotational angle of the retaining device relative to the retaining element may be detected by an angle sensor. The possible relative rotation of the retaining device with respect to the retaining element upon application of a setpoint torque may, for example, be detected by the angle sensor.

Furthermore, a method is preferred in which the torque applied to the closure cap is detected by a torque sensor, and the rotational angle of the retaining device relative to the retaining element is detected by an angle sensor. In the event that a setpoint torque is applied to the closure cap by setting an electrical nominal variable of the drive, the torque sensor may be used for recording or regulating the torque which actually acts on the closure cap. In the case of an untightly sealed test piece, the angle sensor determines a relative rotation of the closure cap with respect to the hollow body. However, the torque sensor may also be used for applying a torque ramp, i.e., a preferably linear torque progression, to the closure cap. A relative rotation of the closure cap with respect to the hollow body may then optionally be determined either by the angle sensor alone, or by the angle sensor as well as the torque sensor on the basis of dissipation of the torque. If the onset of the relative rotation is detected by both sensors concurrently, redundancy is present which makes the method particularly reliable and easily reproducible.

A method is also preferred which is characterized in that a setpoint value for a torque may be set. The limiting torque, the point just at which the closure cap does not begin to rotate with respect to the hollow body, depends on various parameters. For example, the coating of the closure cap plays a role since it influences the friction properties of the closure cap. Furthermore, the sealing element situated between the closure cap and the hollow body is important. In addition, the material used for the hollow body, for example the type of glass, plays a significant role, since here as well very different friction properties may result. Even differences in each delivered batch may result, so that a separate setpoint value must be determined and set for each batch provided with a filling line or capping line. The setpoint value, i.e., the limiting torque, also depends on the manner in which the closure cap is fastened to the hollow body. The closure cap may be connected to the hollow body by flanging or crimping, for example.

A method is also preferred in which a hollow body may be identified as a defective part when, upon application of a torque to the closure cap the magnitude of the torque is less than or equal to the setpoint value, dissipation of the torque may be detected in the torque sensor. In this method, provision is made for the fact that a torque which preferably increases linearly over time is applied to the closure cap. The torque is increased up to a preset setpoint value if the closure cap has not previously come loose and begun to rotate. If the closure cap is seal-tight, the torque may be increased up to the setpoint value without resulting in rotation. However, if the test piece is not tightly sealed, the torque dissipates at a value which is less than or equal to the setpoint value due to the fact that the closure cap comes loose and a transition from static friction to sliding friction occurs. Thus, when such dissipation is detected in the torque sensor, the test piece may be identified as a defective part, and may be separated out at the end of the production line.

Lastly, a method is also preferred in which a hollow body may be identified as a defective part when, upon application of a defined torque to the closure cap, a change in the rotational angle of the retaining device relative to the retaining element may be detected by the angle sensor. Provision is made here that a defined torque is applied to the closure cap, for example by the fact that the drive is acted on by an electrical nominal variable. If a tightly sealed hollow body is engaged with the testing device, no change in the rotational angle of the retaining device relative to the retaining element is detectable, since the closure cap does not come loose when the defined torque is applied. On the other hand, if the test piece is not seal-tight, the closure cap comes loose, and a change in the rotational angle is therefore detectable. In this case the hollow body may be identified as a defective part, and may be separated out at the end of the production line.

DRAWINGS

The invention is explained in greater detail below with reference to the FIGURE.

DETAILED DESCRIPTION

The single FIGURE shows a device 1 for checking the seal-tightness of closure caps on medical hollow bodies. The device has a drive 3 which is able to cause rotation about a longitudinal axis 5. The device 1 also has a retaining element 7 which is suitable for holding a hollow body 9 in a rotationally fixed manner. The hollow body 9 may be a syringe, a carpule, a vial, or a multi- or dual-chamber system. It is important that the hollow body is a medical hollow body.

The device 1 also includes a retaining device 11 which is able to hold a closure cap 13 in a rotationally fixed manner. The closure cap 13 may be designed as a flanged cap or a crimped cap, for example. It is important that the closure cap is securely connected to the hollow body 9 so that a sealing element, situated between the closure cap 13 and the hollow body 9, is compressed in such a way that it tightly seals the hollow body 9.

The retaining device 11 is supported so as to be rotatable with respect to the retaining element 7, and by means of the drive 3 a torque may be directly applied to the closure cap 13 via the retaining device 11. Alternatively, by means of the drive 3 a torque may also be directly applied to the hollow body 9 via the retaining element 7. Here as well, a torque is applied to the closure cap 13 due to the fact that the closure cap, at least until the moment that it comes off, is securely connected to the hollow body 9. A sensor for the relative rotation of the retaining device 11 with respect to the retaining element 7 is also provided, which may be designed as a torque sensor 15 or as an angle sensor 17.

The hollow body 9 has a longitudinal axis 19 which coincides with the longitudinal axis 5 of the device 1. The retaining device 11 and the retaining element 7 are designed in such a way that they grip the hollow body 9 and the closure cap 13 from the same side, as viewed along the longitudinal axis 19. In particular, the retaining device 11 and the retaining element 7 are situated on the same side of the hollow body 9, as viewed along the longitudinal axis 19. In a particularly preferred manner it is provided that an axial distance along the longitudinal axis 19, between the retaining device 11 and the retaining element 7, is so small that the retaining element 7 grips the hollow body in a region which more or less directly adjoins the closure cap 13 along the longitudinal axis 19. The end of the hollow body 9 opposite from the closure cap 13 along the longitudinal axis 19 is therefore free. This end may be used, for example, to transport the hollow body 9 along the production line. For this purpose, the hollow body 9 may optionally be sorted in cartridges or grasped by grippers.

It is also preferred for the axial distance along the longitudinal axis 19 to be adjustable between the retaining device 11 and the retaining element 7. For this purpose, for example, a pneumatic lift control system having pneumatic connections 21, 21' may be provided. This allows the axial distance between the retaining device 11 and the retaining element 7 to be matched to the specific geometry of the test piece to be investigated. For example, the height of the closure cap may be varied on the basis of a variable head height in various batches of test pieces. The device 1 may be adapted to such modifications by changing the axial distance between the retaining device 11 and the retaining element 7. This ensures that the retaining element 7 always grips the hollow body 9 at the same relative position with respect to the closure cap 13. This results in particularly good reproducibility of the measurement.

It may also be provided that the entire device 1 or partial elements of the device 1 are displaceable in the axial direction along the longitudinal axes 5 or 19. This may also preferably be carried out using a pneumatic control system, for which pneumatic connections 21, 21' may likewise be provided. This allows compensation for longitudinal tolerances of the hollow bodies 9. In the production line, the hollow body 9 is typically held at its end opposite from the closure cap. The device 1 may then be brought next to the hollow body 9 from the side at which the closure cap 13 is situated, as viewed along the longitudinal axis 19. The device approaches the hollow body 9 until the closure cap 13 is located in the region of the retaining device 11. The axial distance between the retaining device 11 and the retaining element 7 is then varied in such a way that the retaining element 7 is able to grip the hollow body 9 in a region which more or less directly adjoins the closure cap 13 along the longitudinal axis 19. Hollow bodies 9 of different lengths may thus be tested without the need for modifying the device 1 or the production facility. In addition, longitudinal tolerances of the hollow body 9 may be compensated for in the same manner.

It is apparent from the FIGURE that the retaining device 11 and the retaining element 7 are integrally provided together in a base body 23 of the device 1. This allows a very compact design of the device 1.

At least the retaining device 11 is sterilizable, since it comes particularly close to the opening in the hollow body 9. There must be absolutely no entrainment of pathogens, viruses, or bacteria at this location. However, it is preferred that the retaining element 7, and in particular the entire device 1, are also sterilizable. Thus, the device 1 may also be used in a production facility which is aseptic as a whole.

The mode of operation of the device 1 and the method are explained in greater detail below. The seal-tightness of a sealed hollow body 9 is tested by the device 1 not directly, but, rather, indirectly by application of a torque. The torque may be applied to the closure cap 13 by means of the drive 3, via the retaining device 11. The retaining device 11 is supported so as to be rotatable with respect to the retaining element 7, so that the hollow body 9 does not rotate when a torque is applied to the closure cap 13. Conversely, by means of the drive 3 the torque may also be applied to the hollow body 9 via the retaining element 7. A torque is thus also applied to the closure cap 13 due to the fact that the closure cap, at least until the moment that it comes off, is securely connected to the hollow body 9. In this case the rotatable support of the retaining element 7 with respect to the retaining device 11 ensures that the closure cap 13 does not rotate when a torque is applied to the hollow body 9.

First, a hollow body 9 is gripped by the retaining element 7, and a closure cap 13 is gripped and held by the retaining device 11. A torque may then be applied to the closure cap 13. A sensor is provided which optionally detects a relative rotation of the retaining device 11 with respect to the retaining element 7. This sensor may be designed as a torque sensor 15, for example.

It may then be provided that a small torque is initially applied to the closure cap 13 which, for example, increases linearly up to a setpoint value. If during the course of this torque ramp the closure cap 13 comes loose and begins to rotate, the torque which is detectable at the torque sensor 15 dissipates due to the discontinuous transition from static friction to sliding friction, thus allowing detection of a nonlinear torque progression, in particular dissipation of the torque which otherwise would increase. The setpoint value, up to which the torque ramp is traversed, is selected in such a way that a closure cap 13 which sealingly closes a hollow body 9 is just at the point at which the closure cap is not able to come loose and begin to rotate. Thus, if a dissipating torque is detectable in the torque sensor 17 when the magnitude of the torque is equal to or less than a preset setpoint value, the test piece is a hollow body 9 whose closure cap 13 does not sealingly close the hollow body. The test piece may then be identified as a defective part, and preferably may be separated out at the end of the production line.

The sensor for detecting a relative rotation of the retaining device 11 with respect to the retaining element 7 may also be designed as an angle sensor 17. In this case, for example by the fact that the drive 3 is acted on by a defined electrical nominal variable, a defined torque may be applied to the closure cap 13, and the angle sensor 17 is able to determine whether the closure cap 13 has come loose and begun to rotate. Here as well, the defined torque is selected in such a way that a tightly contacting closure cap 13 is just at the point at which it cannot come loose. If a change in the rotational angle may be registered in the angle sensor 17, the test piece is a defective part which may be identified and preferably separated out at the end of the production line.

It is also possible to integrate both a torque sensor 15 and an angle sensor 17 into the device 1. For example, a torque ramp which is preferably regulated may be traversed, wherein the coming loose of a closure cap 13 is detectable not by the dissipation of the torque at the torque sensor 15, but, rather, on the basis of a change in the rotational angle in the angle sensor 17. However, the coming loose of the closure cap 13 may also be detected in the torque sensor 15 on the basis of dissipation of the torque, and also in the angle sensor 17 on the basis of a change in the rotational angle. Thus, two measuring variables are present for assessing the tight contact of the closure cap 13 on the hollow body 9, as the result of which this exemplary embodiment is particularly less susceptible to error, and provides particularly easily reproducible test results.

However, the torque sensor 15 may also be used to compare a defined torque, which is generated by the drive 3 being acted on by a constant electrical nominal variable, to a preset setpoint value, or record the comparison. Regulation may also be provided, so that when the torque deviates from the setpoint value a variation in the electrical nominal variable is caused, so that the torque which is present may be made equal to the setpoint value. Here as well, coming loose of the closure cap 13 under the action of the preset setpoint torque may be detected in the torque sensor 15 on the basis of dissipation of the torque, and also in the angle sensor 17 on the basis of a change in the rotational angle.

The setpoint value of the torque, at which a tightly contacting closure cap 13 is just at the point at which it cannot come loose and begin to rotate, is preferably adjustable. The setpoint value may then be adapted to the specific conditions which are present in a given batch of test pieces. The torque at which a tightly contacting closure cap 13 is just at the point of not coming off depends, for example, on the coating of the closure cap 13, the sealing element situated between the closure cap 13 and the hollow body 9, and the material of the hollow body 9. For this reason the setpoint value for the limiting torque must be redetermined and reset for each batch of test pieces.

An apparatus is preferably provided for the device 1 for limiting the rotational speed of the retaining device 11. Namely, if a closure cap 13 comes loose and at the same time a constant torque is applied to the closure cap, the rotation of the retaining device 11 is accelerated, so that rotational speeds may possibly be reached which could result in damage to the device 1. The apparatus for limiting the rotational speed is preferably adjusted in such a way that it is able to control the drive 3 so that a maximum rotational speed of the retaining device 11 is reached at which the device 1 is not damaged.

The device 1 may be integrated into a production line, and preferably may be situated directly downstream from a sealing station within the production line. Without exception, this allows all hollow bodies sealed in the sealing station to be tested for seal-tightness, and thus allows direct identification of a possible malfunction in the production facility. The production may then be immediately interrupted, and the malfunction eliminated. In contrast to conventional testing methods, in which testing of random samples takes place at the end of the production line, no cumulative product losses thus occur.

Of course, the device 1 may also be provided at the end of or outside a production line, and in this manner may also test random samples.

It is also possible to integrate the device 1 into laboratory instruments in order to determine, for example, setpoint values, i.e., torques, at which a tightly contacting closure cap 13 is just at the point of not coming loose. Integration of the device into laboratory instruments also makes it possible to calibrate repaired, reconditioned, or newly manufactured devices 1 and to check same for proper function.

Accordingly, it has been shown that the device 1 allows, for the first time, qualitative testing of the seal-tightness of a closure cap on a medical hollow body, using an objective method which allows destruction-free testing, and which is 100% identical for each test piece, directly in the production facility. The test results may be documented and evaluated.

The invention claimed is:

1. A device for checking seal-tightness of a closure cap on a medical hollow body, the device comprising:
- a drive;
- a retaining element for the hollow body;
- a retaining device for the closure cap, the retaining device pivotably supported relative to the retaining element; and
- a rotation sensor for sensing a relative rotation of the retaining device with respect to the retaining element;
- wherein a torque may be applied to the closure cap by the drive, the retaining element, and the retaining device, and further wherein the retaining element and the retaining device are operable to grip the hollow body and the closure cap, respectively, from a same side of the hollow body by advancing in a direction substantially parallel to a longitudinal axis of a hollow body.

2. The device according to claim 1, wherein the retaining device and the retaining element are situated on the same side, as viewed along a longitudinal axis of the hollow body.

3. The device according to claim 1, further comprising a base body, the retaining device and the retaining element integrally provided together in the base body of the device.

4. The device of claim 3, wherein the base body is elongated along an axis and adapted to receive the hollow body along the axis, the base body having a length parallel to the axis significantly greater than a width perpendicular to the axis.

5. The device according to claim 1, wherein the rotation sensor for sensing the relative rotation of the retaining device with respect to the retaining element is a torque sensor.

6. The device according to claim 1, wherein the rotation sensor for sensing the relative rotation of the retaining device with respect to the retaining element is an angle sensor which detects a rotational angle of the retaining device relative to the retaining element.

7. The device according to claim 6, further comprising a torque sensor.

8. The device according to claim 6, further comprising an apparatus for limiting a rotational speed.

9. The device according to claim 1, wherein the closure cap is a flanged cap or a crimped cap.

10. The device according to claim 1, wherein the hollow body is a syringe, a carpule, a vial, or a multi- or dual-chamber system.

11. The device according to claim 1, wherein at least the retaining device is sterilizable.

12. A method for checking seal-tightness of a closure cap on a medical hollow body using a device according to claim 1, the method comprising:
- advancing the retaining element and the retaining device in a direction substantially parallel to the longitudinal axis of the hollow body
- gripping and holding the hollow body with the retaining element;
- gripping and holding the closure cap with the retaining device;
- applying a torque to the closure cap with the drive; and
- detecting a relative rotation of the retaining device with respect to the retaining element by the sensor.

13. The method according to claim 12, further comprising sensing the torque applied to the closure cap by a torque sensor.

14. The method according to claim 13, further comprising detecting the torque applied to the closure cap by a torque sensor, and a rotational angle of the retaining device relative to the retaining element by an angle sensor.

15. The method according to claim 13, further comprising setting a setpoint value for a torque.

16. The method according to claim 13, further comprising identifying a hollow body as a defective part when, upon application of a torque to the closure cap a magnitude of the torque is less than or equal to a setpoint value, dissipation of the torque may be detected in the torque sensor.

17. The method according to claim 12, further comprising detecting a rotational angle of the retaining device relative to the retaining element by an angle sensor.

18. The method according to claim 17, further comprising identifying a hollow body as a defective part when, upon application of a defined torque to the closure cap, a change in the rotational angle of the retaining device relative to the retaining element may be detected by the angle sensor.

19. The device according to claim 1, wherein the retaining element and the retaining device are disposed within a common housing.

20. The device according to claim 19, wherein an end of the hollow body is received within the common housing.

21. The device of claim 1, wherein the retaining element is positioned immediately adjacent the retaining device for gripping the hollow body adjacent an end thereof receiving the closure cap.

22. A device for checking seal-tightness of a closure cap on a medical hollow body, the device comprising:

- a retaining element for the hollow body;
- a retaining device for the closure cap; and
- a sensor for a relative rotation of the retaining device with respect to the retaining element;
- a drive for applying a torque to the closure cap by the drive, the retaining element, and the retaining device; and
- a common housing, the retaining element and the retaining device disposed within the common housing,
- wherein the retaining element and the retaining device are operable to grip the hollow body and the closure cap, respectively, from a common side of the hollow body by advancing in a direction substantially parallel to a longitudinal axis of a hollow body.

23. The device according to claim 22, wherein an end of the hollow body is received within the common housing.

24. The device according to claim 23, in combination with the hollow body, the common housing and the hollow body both being elongated along a common axis when the end of the hollow body is received within the common housing.

25. The device of claim 24, wherein the common housing is elongated along an axis and adapted to receive the hollow body along the axis, the common housing having a length parallel to the axis significantly greater than a width perpendicular to the axis.

26. The device according to claim 22, wherein the retaining element and the retaining device are disposed adjacent to one another and disposed completely with an end of the common housing.

27. The device of claim 22, wherein the retaining element is positioned immediately adjacent the retaining device for gripping the hollow body adjacent an end thereof receiving the closure cap.

28. A device for checking seal-tightness of a closure cap on a medical hollow body, the device comprising:

- a drive;
- a first portion a second portion coupled to said first portion;
- a pneumatic control operable to move said second portion relative to said first portion in a direction substantially parallel to a longitudinal axis of the hollow body;
- a retaining element for the hollow body; and
- a retaining device for the closure cap, the retaining device pivotably supported relative to the retaining element and operable to move relative to said retaining element in a direction substantially parallel to the longitudinal axis of the hollow body; and
- a rotation sensor for sensing a relative rotation of the retaining device with respect to the retaining element;
- wherein a torque may be applied to the closure cap by the drive, the retaining element, and the retaining device, and further wherein the retaining element and the retaining device are operable to grip the hollow body and the closure cap, respectively, from a same side of the hollow body by advancing in the direction substantially parallel to the longitudinal axis of a hollow body.

* * * * *